United States Patent
Chen

(10) Patent No.: US 10,826,333 B2
(45) Date of Patent: Nov. 3, 2020

(54) NFC ANTENNA POWER TAKING DEVICE

(71) Applicant: EXCELSECU DATA TECHNOLOGY CO., LTD., Shenzhen (CN)

(72) Inventor: Liuzhang Chen, Shenzhen (CN)

(73) Assignee: EXCELSECU DATA TECHNOLOGY CO., LTD, Shenzhen (CN)

(*) Notice: Subject to any disclaimer, the term of this patent is extended or adjusted under 35 U.S.C. 154(b) by 0 days.

(21) Appl. No.: 16/765,184

(22) PCT Filed: Aug. 1, 2018

(86) PCT No.: PCT/CN2018/098064
§ 371 (c)(1),
(2) Date: May 19, 2020

(87) PCT Pub. No.: WO2019/100744
PCT Pub. Date: May 31, 2019

(65) Prior Publication Data
US 2020/0280217 A1  Sep. 3, 2020

(30) Foreign Application Priority Data
Nov. 24, 2017  (CN) .......................... 2017 1 1190203

(51) Int. Cl.
*H02J 50/27* (2016.01)
*H02J 50/00* (2016.01)
*H02J 50/10* (2016.01)

(52) U.S. Cl.
CPC ............... *H02J 50/27* (2016.02); *H02J 50/00* (2016.02); *H02J 50/10* (2016.02)

(58) Field of Classification Search
CPC .. H02J 50/27; H02J 5/005; H02J 7/025; H02J 17/00; H02N 2/008; H04B 5/0025–0093;
(Continued)

(56) References Cited

U.S. PATENT DOCUMENTS

| | | | | |
|---|---|---|---|---|
| 2012/0262109 A1* | 10/2012 | Toya | ..................... | H01M 10/44 320/108 |
| 2014/0145504 A1* | 5/2014 | Kayama | .................. | H02M 1/10 307/23 |
| 2018/0131234 A1* | 5/2018 | Uchimoto | ............... | H02J 50/80 |

FOREIGN PATENT DOCUMENTS

| | | |
|---|---|---|
| CN | 1148445 A | 4/1997 |
| CN | 103699929 A | 4/2014 |

(Continued)

*Primary Examiner* — Rexford N Barnie
*Assistant Examiner* — Thai H Tran
(74) *Attorney, Agent, or Firm* — Bayramoglu Law Offices LLC

(57) ABSTRACT

An NFC antenna power taking device includes an antenna, a rectifying module, an energy storage module, and a current adjusting module; the antenna is configured to convert the received electromagnetic field energy into a first voltage, the rectifying module is configured to rectify the first voltage to obtain a second voltage, the second voltage is configured to charge the energy storage module through the current adjusting module, the current adjusting module is configured to adjust the charging current, when the second voltage has a tendency to weaken due to the weakening of the electromagnetic field, the energy storage module is configured to discharge directly to maintain the stability of power supply and ensure the normal operation of the circuit, avoiding overload of the NFC field caused by the energy storage module with large capacity getting too much energy at the moment of the NFC device entry.

6 Claims, 3 Drawing Sheets

(58) Field of Classification Search
CPC .... B60L 5/005; B60L 11/182; B60L 11/1829; B60L 11/1831; B60L 53/12–126; Y02T 90/122; H01F 27/006; H01F 27/02; H01F 38/14; H01F 2038/143–146; H01R 13/6633; A61B 1/00029; A61N 1/3787
USPC .......................................... 307/104; 320/108
See application file for complete search history.

(56) References Cited

FOREIGN PATENT DOCUMENTS

| | | |
|---|---|---|
| CN | 107872101 A | 4/2018 |
| CN | 207573093 U | 7/2018 |
| EP | 2597783 A2 | 5/2013 |
| JP | 2016167915 A | 9/2016 |

\* cited by examiner ial Application No. PCT/CN2018/098064, filed on Aug. 1, 2018, which is based upon and claims priority to Chinese Patent Application No. 201711190203.1, filed on Nov. 24, 2017, the entire contents of which are incorporated herein by reference.

TECHNICAL FIELD

The present disclosure relates to the communication field, and in particular to an NFC antenna power taking device.

BACKGROUND

In a current antenna power taking device, an antenna converts the received electromagnetic field energy into a first voltage, a rectifying module rectifies the first voltage to obtain a second voltage, the second voltage directly charges an energy storage module, when the second voltage is less than the voltage of the energy storage module, the energy storage module discharges externally to maintain power supply stability and ensure the normal operation of the circuit through external discharge.

In current antenna power taking device, when the capacity of the energy storage module is small, it cannot provide better filtering effects, and when the load of the system is heavy, the energy storage module cannot provide a large instantaneous output, resulting in unstable system operation. In addition, when no NFC device is present, to reduce power consumption an NFC reader may be intermittently in inquiry and resulting in sometimes no RF field, the energy storage module with small capacity cannot maintain long-term power supply, which cause the power to be exhausted before the next RF field is established. when the capacity of the energy storage module is large, the moment the NFC device is placed in the field, the energy storage module can obtain large energy from the field, making the field load of the NFC reader too large, affecting the normal communication of the NFC device, even causing the NFC device cannot be recognized by the NFC reader, making the system unable to work stably.

Thus, in current antenna power taking device, there is a problem that the normal NFC communication will be affected when the capacity of the energy storage module is large.

SUMMARY

The disclosure provides an NFC antenna power taking device, which aims to solve the problem that in current NFC antenna power taking device the normal NFC communication will be affected when the capacity of the energy storage module is large.

An NFC antenna power taking device, which includes an antenna, a rectifying module, an energy storage module, and a current adjusting module.

A first feeding terminal of the antenna is connected to a first input terminal of the rectifying module, a second feeding terminal of the antenna of is connected to a second input terminal of the rectifying module, an output terminal of the rectifying module is connected to a first input/output terminal of the current adjusting module, a second input/ output terminal of the current adjusting module is connected to an input/output terminal of the energy storage module.

The antenna converts the received electromagnetic field energy into a first voltage, the rectifying module rectifies the first voltage to obtain a second voltage, the second voltage charges the energy storage module through the current adjusting module and produce a charging current, the current adjusting module adjusts the charging current, when the second voltage has a tendency to weaken due to the weakening of the electromagnetic field, the energy storage module discharges directly to maintain the stability of power supply and ensure the normal operation of the circuit.

Because when the second voltage charges the energy storage module through the current adjusting module, the current adjusting module adjusts the charging current, avoiding overload of the NFC field caused by the energy storage module with large capacity getting too much energy at the moment of the NFC device entry, so that the NFC device can communicate normally, further affected by the NFC card reader and keep work stably.

BRIEF DESCRIPTION OF THE DRAWINGS

In order to more clearly explain the technical creation in the embodiments of the present invention, the following will briefly introduce the drawing needed in the description of the embodiment, obviously, the drawings in the following description are the only some embodiments of the present invention, for those of ordinary skill in the art, without paying any creative labor, other drawings can also be obtained from these drawings.

DETAILED DESCRIPTION OF THE EMBODIMENTS

To make the objectives, technology solutions and advantages of the present disclosure clearer, the embodiments of the present disclosure will be described in further detail below with the reference to the accompanying drawings.

Figure 1:
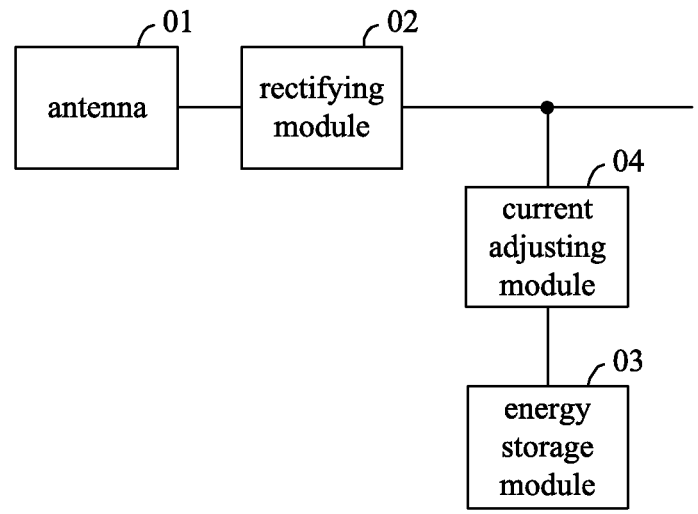
FIG. 1 is a schematic diagram of an overall architecture of the NFC power taking device according to an embodiment of the present disclosure.

FIG. 1 shows the overall architecture of the NFC power taking device according to an embodiment of the present disclosure, for easy of description, only parts related to the embodiments of the present disclosure are shown, and the details are as follows:

An NFC antenna power taking device includes an antenna 01, a rectifying module 02, an energy storage module 03, and a current adjusting module 04.

A first feeding terminal of the antenna 01 is connected to a first input terminal of the rectifying module 02, a second feeding terminal of the antenna 01 is connected to a second input terminal of the rectifying module 02, an output terminal of the rectifying module 02 is connected to a first input/output terminal of the current adjusting module 04, a second input/output terminal of the current adjusting module 04 is connected to an input/output terminal of the energy storage module 03.

In the above NFC antenna power taking device, the antenna 01 converts the received electromagnetic field energy into a first voltage, the rectifying module 02 rectifies the first voltage to obtain a second voltage, the second voltage charges the energy storage module 03 through the current adjusting module 04, the current adjusting module 04 adjusts the charging current, when the second voltage has a tendency to weaken due to the weakening of the electromagnetic field, the energy storage module 03 discharges directly to maintain the stability of power supply and ensure the normal operation of the circuit.

When the second voltage has a tendency to weaken due to the weakening of the electromagnetic field, the energy storage module 03 discharges directly to maintain the stability of power supply and ensure the normal operation of the circuit through discharge as follows: when the second voltage is less than the voltage of the energy storage module 03, the energy storage module 03 discharges directly to maintain the stability of power supply of the NFC antenna power taking device.

Because when the second voltage charges the energy storage module 03 through the current adjusting module 04 as charging current, the current adjusting module 04 adjusts the charging current, avoiding overload of the NFC field caused by the energy storage module 03 with large capacity getting too much energy at the moment of the NFC device entry, so that the NFC device can communicate normally, further affected by the NFC card reader and keep work stably.

Specifically, there are two implementation methods of the NFC antenna power taking device.

Figure 2:
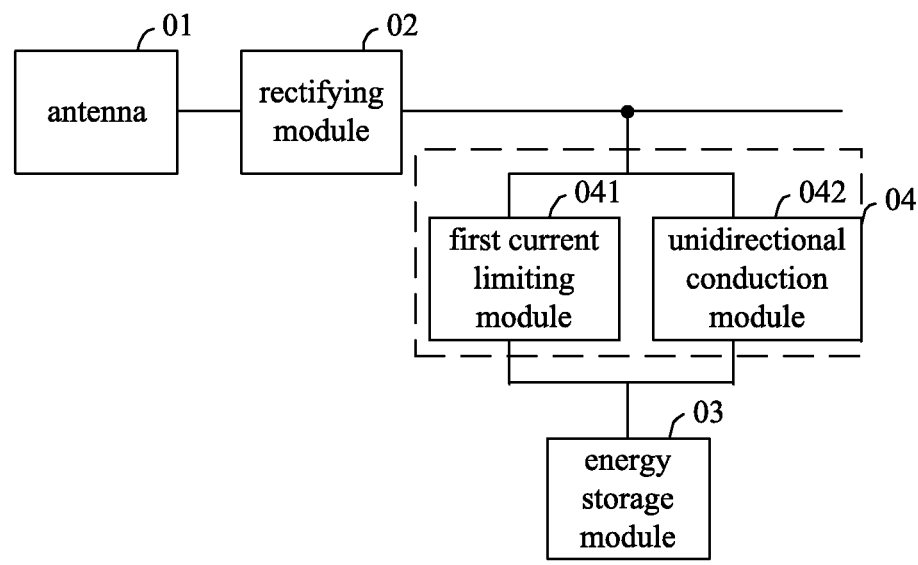
FIG. 2 is a schematic structural diagram of the NFC power taking device according to an embodiment of the present disclosure.

The first implementation method is shown in FIG. 2, the current adjusting module 04 includes a first current limiting module 041 and a unidirectional conduction module 042.

The input terminal of the first current limiting module 041 and the output terminal of the unidirectional conduction module 042 together constitute a first input/output terminal of the current adjusting module 04, The output terminal of the first current limiting module 041 and the input terminal of the unidirectional conduction module 042 together constitute a second input/terminal of the current adjusting module 04.

The second voltage charges the energy storage module 03 through the current adjusting module 04, the current adjusting module 04 adjusts the charging current, when the second voltage is less than the voltage of the energy storage module 03, the energy storage module 03 discharges directly through the current adjusting module 04 is specifically:

The second voltage charges the energy storage module 03 through the first current limiting module 041, and the first current limiting module 041 adjusts the charging current, when the second voltage is less than the voltage of the energy storage module 03, the energy storage module 03 discharges directly through the unidirectional conduction module 042.

When charging the energy storage module 03, because the first current limiting module 041 adjusts the charging current, avoiding overload of the NFC field caused by the energy storage module 03 with large capacity getting too much energy at the moment of the NFC device entry, so that the NFC device can communicate normally, further affected by the NFC card reader and keep work stably.

Figure 3:
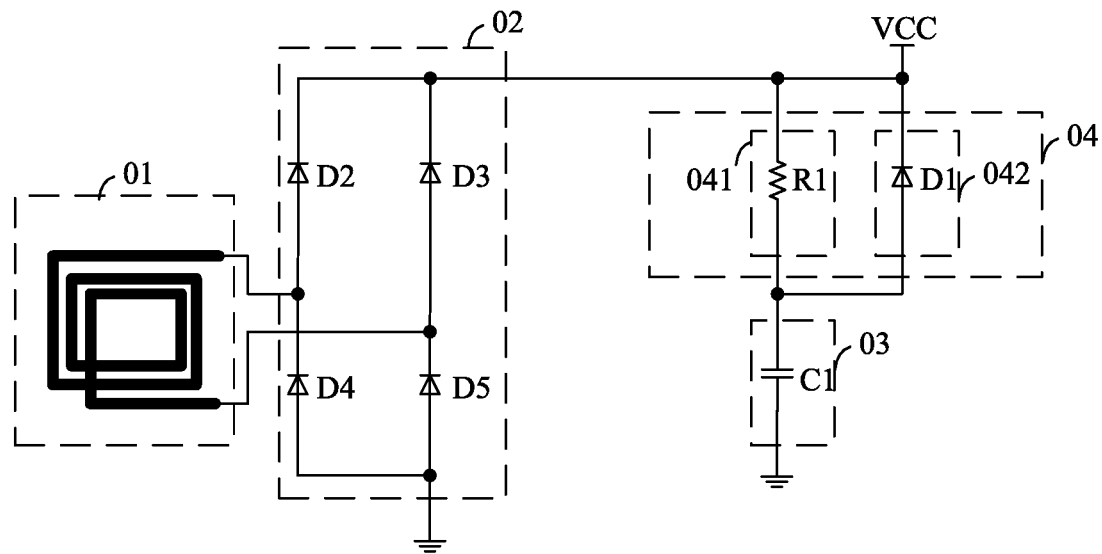
FIG. 3 is a schematic diagram of a circuit structure of the embodiment shown in the FIG. 2.

FIG. 3 shows a circuit structure of the embodiment shown in FIG. 2, for easy of description, only parts related to the embodiments of the present disclosure are shown, and the details are as follows:

The first current limiting module 041 is a first resistor R1.

The first terminal of the first resistor R1 and the second terminal of the first resistor R1 are the input terminal of the first current limiting module 041 and the output terminal of the first current limiting module 041 respectively.

The unidirectional conduction module 042 is a first diode D1.

An anode of the first diode D1 and a cathode of the first diode D1 are the input terminal of the unidirectional conduction module 042 and the output terminal of the unidirectional conduction module 042 respectively.

The current adjusting module 02 includes a second diode D2, a third diode D3, a fourth diode D4 and a fifth diode D5.

The anode of the second diode D2 and the cathode of the fourth diode D4 together constitute the first input terminal of the current adjusting module 02, the anode of the third diode D3 and the cathode of the fifth diode D5 together constitute the second input terminal of the current adjusting module 02, the cathode of the second diode D2 and the cathode of the fourth diode D3 together constitute the first input terminal of the current adjusting module 02, the anode of the fourth diode D4 and the anode of the fifth diode D5 are together grounded.

The energy storage module 03 is a first capacitor C1.

A first terminal of the capacitor C1 is the input/output terminal of the energy storage module 03, a second terminal of the first capacitor C1 is grounded.

The circuit shown in FIG. 3 is further described below in conjunction with the working principle:

In the specific implementation process, the antenna 01 converts the received electromagnetic field energy into the first voltage, the second to fifth diode D2 to D5 rectify the first voltage to obtain a second voltage, and the second voltage charges the first capacitor C1 through the first resistor R1, the first resistor R1 regulates the charging current (because the first resistor R1 functions as a current limiting resistor, the charging current is reduced), when the second voltage is less than the voltage of the first capacitor C1, the first capacitor C1 discharges through the first diode D1 to maintain the stability of power supply and ensure the normal operation of the circuit.

The above implementation has two disadvantages:

1) When the first capacitor C1 is charged, as the voltage across the first capacitor C1 increases, the charging current across the first resistor R1 will become smaller and smaller, making the charging rate slower;

2) When the first capacitor C1 discharges, a voltage drops occurs on the first diode D1, which affects the power supply efficiency.

Therefore, the following second implementation is purposed to solved the above two questions.

Figure 4:
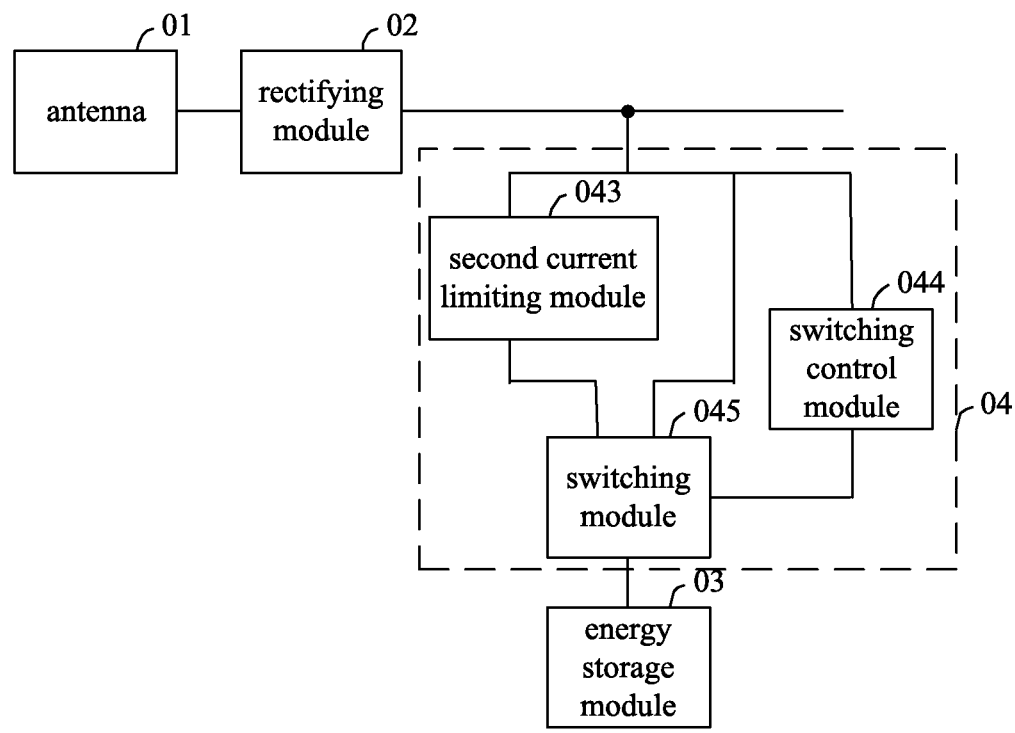
FIG. 4 is a schematic structural diagram of the NFC power taking device according to another embodiment of the present disclosure.

The second implementation is shown in FIG. 4, the current adjusting module 04 includes a second current limiting module 043, a switching control module 044 and a switching module 045.

The input terminal of the second current limiting module 043, the first input/output terminal of the switching module 045 and the input terminal of the switching control module 044 together constitute the first input/output terminal of the current adjusting module 04, the second input output terminal of the switching module 045 is the second input/output terminal of the current adjusting module 04, the output terminal of the switching control module 044 is connected to a control terminal of the switching module of the switching module 045, the output terminal of the second current limiting module 043 is connected to the input terminal of the switching module 045.

The second voltage charges the energy storage module 03 through the current adjusting module 04, the current adjusting module 04 adjusts the charging current as follows:

The second voltage charges the energy storage module 03 through the second current limiting module 043, the switching control module 044 outputs a control voltage, when the switching module 045 determines that the control voltage exceeds a voltage threshold, the switching module 045 switch a charging channel to enable the second voltage to directly charge the energy storage module 03.

When the second voltage is less than the voltage of the energy storage module 03, the energy storage module 03 discharges directly through the current adjusting module 04 is specifically: When the second voltage is less than the voltage of the energy storage module 03, the energy storage module 03 discharges directly through the switching module 045.

When charging the energy storage module 03, because the second current limiting module 043 adjusts the charging current, avoiding overload of the NFC field caused by the energy storage module 03 with large capacity getting too much energy at the moment of the NFC device entry, so that the NFC device can communicate normally, further affected by the NFC card reader and keep work stably.

Figure 5:
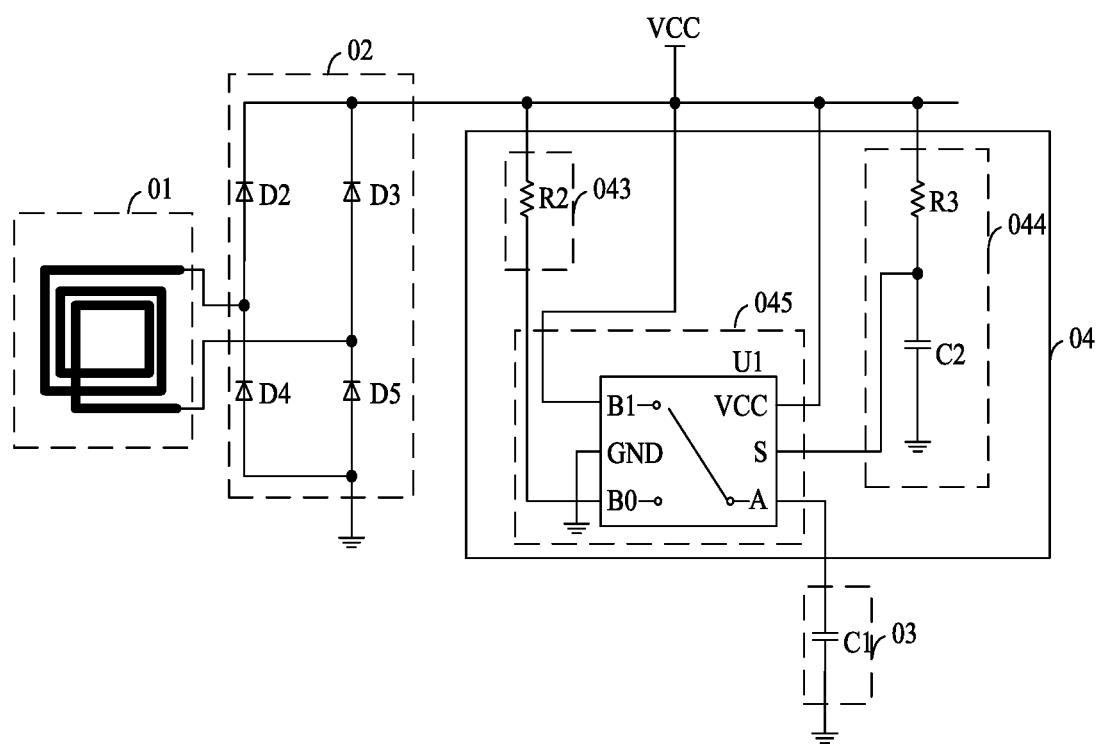
FIG. 5 is a schematic diagram of a circuit structure of the embodiment shown in the FIG. 4.

FIG. 5 shows a circuit structure of the embodiment shown in FIG. 4, for easy of description, only parts related to the embodiments of the present disclosure are shown, and the details are as follows:

The second current limiting module 043 is a second resistor R2.

The first terminal of the second resistor R2 and the second terminal of the second resistor R2 are the input terminal of the second current limiting module 043 and the output terminal of the second current limiting module 043 respectively.

The switching control module 044 includes a third resistor R3 and a second capacitor C2.

The first terminal of the third resistor R3 is input terminal of the switching control module 044, the second terminal of the third resistor R3 and the first terminal of the second capacitor C2 together constitute the output terminal of the switching control module 044, the second terminal of the second capacitor C2 is grounded.

The switching module 045 is an analog switching switch U1.

The power supply terminal VCC of the analog switching switch U1 and the first input/output terminal B1 of the analog switching switch U1 together constitute the first input/output terminal of the switching module 045, the input terminal B0 of the analog switching switch U1 is the input terminal of the switching module 045, the logic control terminal S of the analog switching switch U1 is control terminal of the switching module 045, the second input/output terminal A of the analog switching switch U1 is the second input/output terminal of the switching module 045, and the ground terminal of the analog switching switch U1 is grounded.

The rectifying module 02 includes the second diode D2, the third diode D3, the fourth diode D4 and the fifth diode D5.

The anode of the second diode D2 and the cathode of the fourth diode D4 together constitute the first input terminal of the rectifying module 02, the anode of the third diode D3 and the cathode of the fifth diode D5 together constitute the second input terminal of the rectifying module 02, the cathode of the second diode D2 and the cathode of the fourth diode D3 together constitute the first input terminal of the rectifying module 02, the anode of the fourth diode D4 and the anode of the fifth diode D5 are together connected grounded.

The energy storage module 03 is a first capacitor C1.

A first terminal of the capacitor C1 is the input/output terminal of the energy storage module 03, a second terminal of the first capacitor C1 is grounded.

The circuit shown in FIG. 5 is further described below in conjunction with the working principle:

In the specific implementation process, the antenna 01 converts the received electromagnetic field energy into the first voltage, the second to fifth diode D2 to D5 rectify the first voltage to obtain a second voltage, at this time, the voltage across the second capacitor C2 does not exceed the voltage threshold, the input terminal B0 of the analog switching switch U1 is connected to the second input/output terminal A of the analog switching switch U1, the second voltage charges the first capacitor C1 through the second resistor R2, when the voltage across the second capacitor C2 exceeds the voltage threshold, the analog switching switch U1 switches the charging channel, the first input/output terminal B1 of the analog switching switch U1 is connected to the second input/output terminal A of the analog switching switch U1, so that the second voltage directly charges the first capacitor C1, which increases the charging rate; when the second voltage is less than the voltage of the first capacitor C1, the first capacitor C1 discharges through the analog switching switch U1 to maintain the stability of power supply and ensure the normal operation of the circuit without generating an additional voltage drop.

The above are preferred embodiments of the present disclosure and are not intended to limit the present disclosure, any modification, equivalent replacement, or improvement made within the spirit and the principle of the present disclosure shall be included in the protection scope of the present disclosure.

The invention claimed is:

1. An NFC antenna power taking device, comprising:
   an antenna;
   a rectifying module;
   an energy storage module; and
   a current adjusting module;
   wherein a first feeding terminal of the antenna is connected to a first input terminal of the rectifying module, a second feeding terminal of the antenna is connected to a second input terminal of the rectifying module, an output terminal of the rectifying module is connected to a first input/output terminal of the current adjusting module, a second input/output terminal of the current adjusting module is connected to an input/output terminal of the energy storage module;
   the antenna is configured to convert received electromagnetic field energy into a first voltage, the rectifying module is configured to rectify the first voltage to obtain a second voltage, the second voltage is configured to charge the energy storage module through the current adjusting module and produce a charging current, the current adjusting module is configured to adjust the charging current, the energy storage module is configured to discharge directly to maintain stability of a power supply and ensure a normal operation of a circuit when the second voltage has a tendency to weaken due to weakening of the electromagnetic field;

the current adjusting module comprises a second current limiting module, a switching control module and a switching module;

an input terminal of a first current limiting module, a first input/output terminal of the switching module and an input terminal of the switching control module together constitute the first input/output terminal of the current adjusting module, a second input/output terminal of the switching module is the second input/output terminal of the current adjusting module, an output terminal of the switching control module is connected to a control terminal of the switching module, an output terminal of the first current limiting module is connected to an input terminal of the switching module;

the second voltage is configured to charge the energy storage module through the first current limiting module, the switching control module is configured to output a control voltage; when the switching module determines that the control voltage exceeds a voltage threshold, the switching module is configured to switch a charging channel and the second voltage directly charges the energy storage module;

the energy storage module is configured to discharge through the switching module when the second voltage is less than a voltage of the energy storage module.

2. The NFC antenna power taking device of claim 1, wherein the first current limiting module is a first resistor;

a first terminal of the first resistor and a second terminal of the first resistor are the input terminal of the first current limiting module and the output terminal of the first current limiting module, respectively.

3. The NFC antenna power taking device of claim 1, wherein the switching control module comprises a second resistor and a first capacitor;

a first terminal of the second resistor is the input terminal of the switching control module, a second terminal of the second resistor and a first terminal of the first capacitor together constitute the output terminal of the switching control module, a second terminal of the first capacitor is grounded.

4. The NFC antenna power taking device of claim 1, wherein the switching module is an analog switching switch;

a power supply terminal of the analog switching switch and a first input/output terminal of the analog switching switch together constitute the first input/output terminal of the switching module, an input terminal of the analog switching switch is the input terminal of the switching module, a logic control terminal of the analog switching switch is the control terminal of the switching module, a second input/output terminal of the analog switching switch is the second input output terminal of the switching module, and a ground terminal of the analog switching switch is grounded.

5. The NFC antenna power taking device of claim 1, wherein the rectifying module comprises a first diode, a second diode, a third diode, and a fourth diode;

an anode of the first diode and a cathode of the third diode together constitute the first input terminal of the rectifying module, an anode of the second diode and a cathode of the fourth diode together constitute the second input terminal of the rectifying module, a cathode of the first diode and a cathode of the third diode together constitute the output terminal of the rectifying module, an anode of the third diode and an anode of the fourth diode are together grounded.

6. The NFC antenna power taking device of claim 1, wherein the energy storage module is a second capacitor;

a first terminal of the second capacitor is the input/output terminal of the energy storage module, a second terminal of the second capacitor is grounded.

* * * * *